(12) United States Patent
Thakolsri et al.

(10) Patent No.: US 12,150,080 B2
(45) Date of Patent: Nov. 19, 2024

(54) COMMUNICATION SYSTEM AND METHOD FOR OPERATING A COMMUNICATION SYSTEM

(71) Applicant: NTT DOCOMO, INC., Tokyo (JP)

(72) Inventors: Srisakul Thakolsri, Munich (DE); Malla Reddy Sama, Munich (DE); Riccardo Guerzoni, Munich (DE); Jari Mutikainen, Munich (DE); Hiroshi Ishikawa, Tokyo (JP); Atsushi Minokuchi, Tokyo (JP); Ban Al-Bakri, Juan les Pins (FR)

(73) Assignee: NTT DOCOMO, INC., Tokyo (JP)

( * ) Notice: Subject to any disclaimer, the term of this patent is extended or adjusted under 35 U.S.C. 154(b) by 255 days.

(21) Appl. No.: 17/773,709

(22) PCT Filed: Oct. 29, 2020

(86) PCT No.: PCT/EP2020/080407
§ 371 (c)(1),
(2) Date: May 2, 2022

(87) PCT Pub. No.: WO2021/089405
PCT Pub. Date: May 14, 2021

(65) Prior Publication Data
US 2022/0394652 A1 Dec. 8, 2022

(30) Foreign Application Priority Data

Nov. 8, 2019 (EP) .................................... 19208157

(51) Int. Cl.
*H04W 60/00* (2009.01)
*H04W 8/02* (2009.01)
*H04W 36/14* (2009.01)

(52) U.S. Cl.
CPC .......... *H04W 60/005* (2013.01); *H04W 8/02* (2013.01); *H04W 36/14* (2013.01)

(58) Field of Classification Search
CPC ..... H04W 60/005; H04W 8/02; H04W 36/14; H04W 88/16; H04W 60/00
See application file for complete search history.

(56) References Cited

U.S. PATENT DOCUMENTS

2022/0394456 A1\* 12/2022 Liu ..................... H04W 48/18

OTHER PUBLICATIONS

International Search Report issued in PCT/EP2020/080407 mailed on Jan. 29, 2020 (4 pages).
Written Opinion of the International Searching Authority issued in PCT/EP2020/080407 mailed on Jan. 29, 2020 (8 pages).

(Continued)

*Primary Examiner* — Marisol Figueroa
(74) *Attorney, Agent, or Firm* — Osha Bergman Watanabe & Burton LLP

(57) ABSTRACT

Methods and devices provide for enhancements to the Steering of Roaming (SoR) provisioning during the registration procedure by introducing a new parameter generated by a user data management network function of the home network which indicates to roaming networks whether to request updated SoR information based on a registration type received in a registration request from a mobile terminal.

12 Claims, 7 Drawing Sheets

(56) References Cited

OTHER PUBLICATIONS

Extended European Search Report issued in counterpart European Patent Application No. 19208157.8, mailed on Apr. 28, 2020 (12 pages).
Office Action issued in the counterpart European Patent Application No. 19208157.8, mailed on Nov. 19, 2020 (4 pages).
3GPP TS 23.122 V15.6.0; "3rd Generation Partnership Project; Technical Specification Group Core Network and Terminals; Non-Access-Stratum (NAS) functions related to Mobile Station (MS) in idle mode (Release 15)"; Dec. 2018 (63 pages).

* cited by examiner

COMMUNICATION SYSTEM AND METHOD FOR OPERATING A COMMUNICATION SYSTEM

The present disclosure relates to components and signaling in a communication systems and corresponding methods.

In communication networks such as a 5G mobile radio communication network, it may be desirable to introduce and implement enhancements to enable Steering of Roaming (SoR) provisioning for different registration types, e.g. "Initial Registration," "Emergency Registration," "Mobility Registration Update," "Periodic Registration Update," or the like, when attempting to register with a Visiting Public Land Mobile Network (VPLMN).

SoR has been introduced by The Third Generation Partnership Project (3GPP) to allow a mobile network operator (MNO) to decide which visiting networks a subscriber may use when roaming by implementing two general features. The first features allows the Home Public Land Mobile Network (HPLMN) to direct a mobile terminal, e.g. a User Equipment (UE), to search for a specific VPLMN and, if the specific VPLMN is available, transition to the specific VPLMN as soon as possible. The second feature allows the HPLMN to steer a UE to a preferred VPLMN if the UE registers with another VPLMN when roaming.

However, current SoR methods may be prone to problematic situations, known as "Replay Attack" scenarios. For example, according to current methods, a UE may be configured by an HPLMN to receive SoR information for a particular registration type, e.g. "Initial Registration." If the UE has already successfully registered with a VPLMN indicated in a previously received SoR information, the UE may later register with the same VPLMN automatically. In this case, the VPLMN may not request subscription data for the UE from the HPLMN as long as the VPLMN already has subscription data from a previous registration. If there are any updates at the HPLMN side to direct the UE to register with another VPLMN different from the VPLMN the UE has already registered with, however, the UE will not receive the necessary information to redirect to another VPLMN.

Furthermore, based on the existing implementation at the HPLMN side, it is not possible to provide the UE with valid SoR information from the HPLMN per every registration, e.g. per every "Initial Registration," since the VPLMN already has a subscription data for the UE from a previous registration and will not request further SoR information from the HPLMN for subsequent registrations, even if there are updates to the SoR information.

In order to avoid such problematic scenarios, it may be desirable for a network function of the VPLMN to inform a network function of the HPLMN of SoR information whenever the VPLMN receives a registration request message of a particular registration type even if the network function of the VPLMN already has subscription data for the UE. This may be desirable for all the registration types that may be indicated in the registration request from the mobile terminal, e.g. for "Initial Registration" type requests, for "Emergency Registration" type requests, and for other types of registration requests.

According to some aspects, the methods and devices disclosed herein allow for the HPLMN to provide an SoR information specific to a registration type. Furthermore, the methods and devices disclosed herein reduce or eliminate the "Replay Attack" scenario in which a VPLMN uses SoR information from a previous registration for a mobile terminal whenever the mobile terminal requests subsequent registrations to the VPLMN, even if this SoR information is no longer valid or preferred by the HPLMN. In addition, the methods and devices of this disclosure optimize the signaling exchanged between a network function component of a HPLMN (e.g. an HPLMN Unified Data Management function, i.e. H-UDM) and a network function component of a VPLMN (e.g. a VPLMN Access and Mobility Management function, i.e. V-AMF).

By generating a new indication parameter at a data management network function component of the HPLMN (e.g. H-UDM) and providing this indication parameter to a mobility management network function component of the VPLMN (e.g. V-AMF) for storage, the methods and devices disclosure herein are able to influence future signaling between the networks in order to provide the benefits described herein.

According to some aspects, a communication system is provided including a network function component of a secondary mobile communication network and a network function component of a primary mobile communication network. The primary mobile communication network may be, for example, a Home Public Land Mobile Network (HPLMN) and the secondary mobile communication network may be, for example, a Visiting Public Land Mobile Network (VPLMN). The network function for the primary mobile communication network may be a Unified Data Management (UDM) function and the network function for the secondary mobile communication network may be an Access and Mobility Management Function (AMF).

The network function component of the secondary mobile communication network may include one or more processors configured to receive a registration request from a mobile terminal, wherein the registration request includes a registration type of a plurality of registration types; forward, to a network function component of a primary mobile communication network, a first message including information based on the registration request; receive a response message from the network function component of the primary mobile communication network, the response message including a communication network connection information for one or more of the plurality of registration types and an indication whether the primary mobile communication network or the network function component of the primary mobile communication network requests the network function component of the secondary mobile communication network to get an updated communication network connection information from the network function component of the primary mobile communication network for one or more of the plurality of registration types in response to a subsequent registration request from the mobile terminal; store the communication network connection information and/or the indication; and provide the communication network connection information to the mobile terminal.

The network function component of the primary mobile communication network may include one or more processors configured to generate, specific to a mobile terminal, a communication network connection information for connecting to one or more secondary communication networks based on one or more of a plurality of registration types and an indication whether the primary mobile communication network or the network function component of the primary mobile communication network requests the network function component of the secondary mobile communication network to get an updated communication network connection information for one or more of the plurality of registration types; receive a message from a network function component of a secondary mobile communication network, wherein the message is based on a registration request from the mobile terminal, wherein the registration request includes a registration type of the plurality of registration types; and transmit a response message to the network management function component of the secondary mobile communication network, wherein the response message includes communication network connect information based on the registration type from the registration request and the indication.

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

Figure 1:
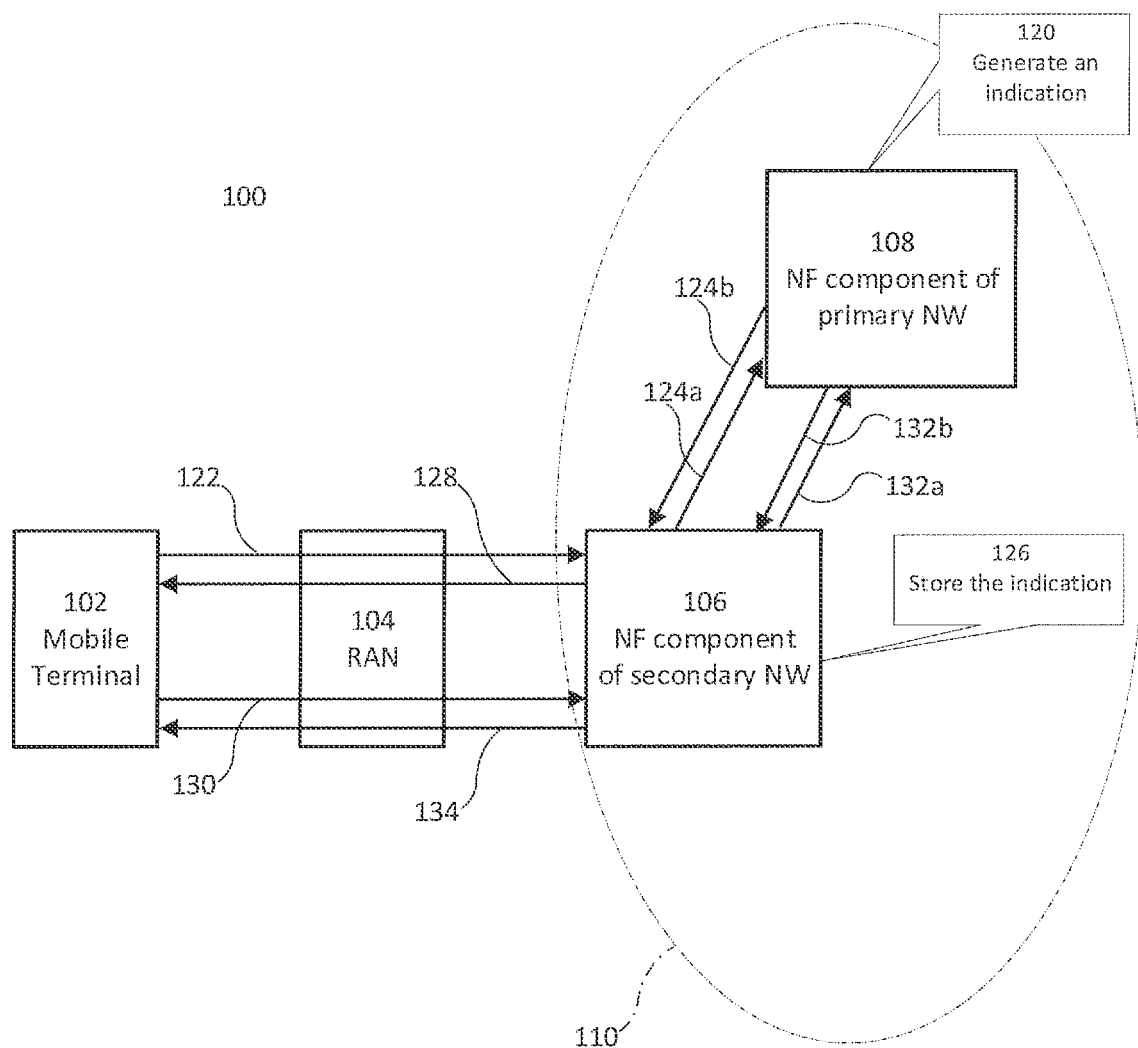
FIG. 1 shows an exemplary radio communication system, for example configured according to 5G (Fifth Generation) as specified by 3GPP (Third Generation Partnership Project), according to some aspects.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

A "processor" (or equivalently "processing circuit," "processing circuitry," or the like) as used herein is understood as referring to any circuit that performs an operation(s) on signal(s), such as e.g. any circuit that performs processing on an electrical signal or an optical signal. A processor may thus refer to any analog or digital circuitry that alters a characteristic or property of an electrical or optical signal, which may include analog and/or digital data. A processor may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processor may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single processor may be equivalently split into two or more processors, and conversely that two or more separate processors may be combined into a single equivalent processor.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "mobile terminal" utilized herein refers to user-side devices (both portable and fixed) that can connect to a core network and/or external data networks via a radio access network. A "mobile terminal" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases mobile devices can also include application-layer components, such as application processors or other general processing components that are directed to functionality other than wireless communications. Mobile terminals can optionally support wired communications in addition to wireless communications.

The terms "radio access network nodes" or "network access node" as utilized herein refers to a network-side device that provides a radio access network with which terminal devices can connect and exchange information with a core network and/or external data networks through the network access node. "Radio access network nodes" or "network access nodes" can include any type of base station or access point, including macro base stations, micro base stations, NodeBs, evolved NodeBs (eNBs), gNB or New Radio (NR) for $5^{th}$ generation mobile base station, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices The terms "radio communication network," "communication network," "wireless network," "mobile communication network," or the like as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Various examples corresponding to aspects of this disclosure are described below:

In Example 1, a network function component of a secondary mobile communication network including one or more processors, the one or more processors configured to receive a registration request from a mobile terminal, wherein the registration request includes a registration type of a plurality of registration types; forward, to a network function component of a primary mobile communication network, a first message including information based on the registration request; receive a response message from the network function component of the primary mobile communication network, the response message including a communication network connection information for one or more of the plurality of registration types and an indication whether the primary mobile communication network or the network function component of the primary mobile communication network requests the network function component of the secondary mobile communication network to get an updated communication network connection information from the network function component of the primary mobile communication network for one or more of the plurality of registration types in response to a subsequent registration request from the mobile terminal; store the communication network connection information and/or the indication; and provide the communication network connection information to the mobile terminal.

In Example 2, the subject matter of Example(s) 1 may include the one or more processors further configured to receive the subsequent registration request from the mobile terminal, wherein the subsequent registration request includes a second registration type of the plurality of registration types; and determine whether to generate a second message to transmit to the network function component of the primary network based on the stored indication and the second registration request.

In Example 3, the subject matter of Example(s) 2 may include wherein the second registration type is the same as the registration type.

In Example 4, the subject matter of Example(s) 2 may include wherein the second registration type is different from the registration type.

In Example 5, the subject matter of Example(s) 2-4 may include the one or more processors further configured to generate and transmit, to the network function component of the primary mobile communication network, the second message including information based on the second registration request; and receive an updated response from the network function component of the primary mobile communication network, the updated response including an updated communication network connection information for one or more registration types of the plurality of registration types.

In Example 6, the subject matter of Example(s) 5 may include the one or more processors further configured to store the updated communication network connection information; and provide the updated communication network connection information to the mobile terminal.

In Example 7, the subject matter of Example(s) 5 may include the updated response further including an updated indication whether to request further updated network connection information from the network function component of the primary mobile communication network for one or more of the plurality of registration types in response to one or more further subsequent registration requests from the mobile terminal.

In Example 8, the update communication network connection information of Example 5, 6 and/or 7 is the same as the communication network connection information of Example(s) 1 to 4.

In Example 9, the update communication network connection information of Example 5, 6 and/or 7 is different from the communication network connection information of Example(s) 1 to 4.

In Example 10, the subject matter of Example(s) 1-9 may include wherein the indication is made available through a configuration or a policy at the network function component of the secondary mobile communication network, or reception of the response message from the network function of the primary mobile communication when the network function of the primary mobile communication provides the communication network connection information to the network function of the secondary mobile communication.

In Example 11, the subject matter of Example(s) 1-10 may include wherein the network function component of the secondary mobile communication network is an Access and Mobility Management Function of the secondary mobile communication network.

In Example 12, the subject matter of Example(s) 1-11 may include wherein the network function component of the primary mobile communication network is a Unified Data Management function of the primary mobile communication network.

In Example 13, the subject matter of Example(s) 1-12 may include wherein the primary mobile communication network is a home communication network where a subscription data of the mobile terminal is stored.

In Example 14, the subject matter of Example(s) 1-13 may include wherein the secondary mobile communication network is a visited mobile communication network where the mobile terminal is roaming.

In Example 15, a network function component of a primary mobile communication network including one or more processors, the one or more processors configured to generate, specific to a mobile terminal, a communication network connection information for connecting to one or more secondary communication networks based on one or more of a plurality of registration types and an indication whether the primary mobile communication network or the network function component of the primary mobile communication network requests the network function component of the secondary mobile communication network to get an updated communication network connection information for one or more of the plurality of registration types; receive a message from a network function component of a secondary mobile communication network, wherein the message is based on a registration request from the mobile terminal, wherein the registration request includes a registration type of the plurality of registration types; and transmit a response message to the network management function component of the secondary mobile communication network, wherein the response message includes communication network connect information based on the registration type from the registration request and the indication.

In Example 16, the subject matter of Example(s) 15 may include the one or more processors further configured to generate, specific to the mobile terminal, an updated communication network connection information for connecting to one or more secondary networks based on one or more of the plurality of registration types; receive a second message from the network function component of the secondary mobile communication network, wherein the second message is triggered by the indication; and transmit the updated network connection information to the mobility management function component.

In Example 17, the subject matter of Example(s) 16 may include the one or more processors further configured to generate an updated indication whether the primary mobile communication network or the network function component of the primary mobile communication network requests the network function component of the secondary mobile communication network to get further updated communication network connection information for one or more of the plurality of registration types and transmit the updated indication to the network function component of the secondary mobile communication network.

In Example 18, the subject matter of Example(s) 15-17 may include wherein the network function component of the primary mobile communication network is a Unified Data Management function of the primary mobile communication network.

In Example 19, the subject matter of Example(s) 18 may include wherein the network function component of the secondary mobile communication network is an Access and Mobility Management Function of the secondary mobile communication network.

In Example 20, the subject matter of Example(s) 15-17 may include wherein the primary mobile communication network is a home communication network where a subscription data of the mobile terminal is stored.

In Example 21, the subject matter of Example(s) 15-17 may include, wherein the secondary mobile communication network is a visited mobile communication network where the mobile terminal is roaming.

In Example 22, an information signal transmitted from a network function component of a primary mobile communication network to a network function component of a secondary mobile communication network, the information signal including a message having a message field indicating, specific to a mobile terminal, whether the primary mobile communication network requires the network function of the secondary mobile communication network to request an updated network connection information for providing to the mobile terminal based on a subsequent registration request transmitted from the mobile terminal to the network function of the secondary mobile communication network.

In Example 23, the subject matter of Example(s) 22 may include wherein the subsequent registration request includes a registration type of a plurality of registration types.

In Example 24, the subject matter of Example(s) 22 may include wherein the updated communication network connection information includes directions for connecting to a further secondary communication network based on one or more registration types of the plurality of registration types.

In Example 25, the subject matter of Example(s) 24 may include wherein the further secondary communication network is different from the secondary communication network.

In Example 26, a method for a network function component of a secondary mobile communication network to provide a communication network connection information to a mobile terminal, the method including receiving a registration request from the mobile terminal, wherein the registration request includes a registration type of a plurality of registration types; transmitting, to a network function component of a primary mobile communication network, a first message including information based on the registration request; receiving a response message from the network function component of the primary mobile communication network, the response message including a communication network connection information for one or more of the plurality of registration types and an indication whether the primary mobile communication network or the network function component of the primary mobile communication network requests the network function component of the secondary mobile communication network to get an updated communication network connection information from the network function component of the primary mobile communication network for one or more of the plurality of registration types in response to a subsequent registration request from the mobile terminal; storing the communication network connection information and the indication; and providing the communication network connection information to the mobile terminal.

In Example 27, the subject matter of Example(s) 26 may include receiving a second registration request from the mobile terminal, wherein the registration request includes a second registration type of the plurality of registration types; and determining whether to generate a second message to transmit to the network function component of the primary mobile communication network based on the stored indication and the second registration request.

In Example 28, the subject matter of Example(s) 27 may include wherein the second registration type is the same as the registration type.

In Example 29, the subject matter of Example(s) 27 may include wherein the second registration type is different from the registration type.

In Example 30, the subject matter of Example(s) 27-29 may include generating and transmitting, to the network function component of the primary mobile communication network, the second message including information based on the second registration request; and receiving an updated response from the network function component of the primary mobile communication network, the updated response including an updated communication network connection information for one or more registration types of the plurality of registration types.

In Example 31, the subject matter of Example(s) 30 may include storing the updated communication network connection information; and providing the updated communication network connection information to the mobile terminal.

In Example 32, the subject matter of Example(s) 30 may include the updated response further including an updated indication whether to request further updated communication network connection information for one or more of the plurality of registration types.

In Example 33, the subject matter of Example(s) 26 may include wherein the network function component of the primary mobile communication network is a Unified Data Management function of the primary mobile communication network.

In Example 34, the subject matter of Example(s) 26 may include wherein the network function component of the secondary mobile communication network is an Access and Mobility Management Function of the secondary mobile communication network.

In Example 35, the subject matter of Example(s) 26 may include wherein the primary mobile communication network is a home communication network where a subscription data of the mobile terminal is stored.

In Example 36, the subject matter of Example(s) 26 may include wherein the secondary mobile communication network is a visited mobile communication network where the mobile terminal is roaming.

In Example 37, a method for a network function component of a primary mobile communication network to provide a communication network connection information specific to a mobile terminal, the method including generating, specific to the mobile terminal, a communication network connection information for connecting to one or more secondary mobile communication networks based on a plurality of registration types and an indication whether the primary mobile communication network or the network function component of the primary mobile communication network requests the network function component of the secondary mobile communication network to get an updated communication network connection information for one or more of the plurality of registration types; receiving a first message from a network function component of a secondary mobile communication network, wherein the first message is based on a registration request from the mobile terminal, wherein the registration request includes a registration type of the plurality of registration types; and transmitting a response message to the network function component of the secondary mobile communication network, wherein the response message includes communication network connect information based on the registration type from the registration request and the indication.

In Example 38, the subject matter of Example(s) 37 may include generating, specific to the mobile terminal, an updated network connection information for connecting to one or more secondary communication networks based on one or more of the plurality of registration types; receiving a second message from the network function component of the secondary mobile communication network, wherein the second message is triggered by the indication; and transmitting the updated network connection information to the network function component of the secondary mobile communication network.

In Example 39, the subject matter of Example(s) 38 may include generating an updated indication whether to request further updated network connection information for one or more of the plurality of registration types; and transmitting the updated indication to the network function component of the secondary mobile communication network.

In Example 40, the subject matter of Example(s) 38 may include wherein the network function component of the primary mobile communication network is a Unified Data Management function of the primary mobile communication network.

In Example 41, the subject matter of Example(s) 37 may include wherein the network function component of the secondary mobile communication network is an Access and Mobility Management Function of the secondary mobile communication network.

In Example 42, the subject matter of Example(s) 37 may include wherein the primary mobile communication network is a home communication network where a subscription data of the mobile terminal is stored.

In Example 43, the subject matter of Example(s) 37 may include wherein the secondary mobile communication network is a visited mobile communication network where the mobile terminal is roaming.

It should be noted that one or more of the features of any of the examples above may be combined with any one of the other examples.

According to further embodiments, a computer program and a computer readable medium including instructions, which, when executed by a computer, make the computer perform the method of any one of the above Examples are provided.

In the following, various examples will be described in more detail.

FIG. 1 shows an exemplary radio communication system 100 schematic flow diagram, for example, configured according to 5G (Fifth Generation) as specified by the 3GPP (Third Generation Partnership Project), according to some aspects.

It is appreciated that radio communication system 100 is exemplary in nature and may therefore be simplified for purposes of this explanation.

The radio communication system 100 includes a mobile terminal 102 such as a UE (user equipment). The mobile terminal 102, also referred to as a subscriber terminal, UE, or the like, forms the terminal side while the other components of the radio communication system 100 described in the following are part of the mobile radio communication network side.

Furthermore, the radio communication system 100 includes a radio access network (RAN) 104, which may include a plurality of radio access network nodes, e.g. base stations configured to provide radio access in accordance with a 5G (Fifth Generation) radio access technology (5G New Radio). It should be noted that the radio communication system 100 may also be configured in accordance with LTE (Long Term Evolution) or another mobile radio communication standard, and 5G is used herein simply for exemplary purposes and for purposes of streamlining the explanation. Each radio access network node of RAN 104 may provide a radio communication with the mobile terminal 102 over an air interface. It should be noted that the radio access network 104 may include any number of radio access network nodes.

The radio communication system 100 further includes a core network (Core NW, or CN) 110 including a network function (NF) component 106 of a secondary mobile communication network (i.e. NF component of secondary NW) for signaling with a mobile terminal 102 via RAN 104 and a network function (NF) component of a primary mobile communication network 108 (i.e. NF component of primary NW).

For purposes of the disclosure herein, the HPLMN may be referred to as a primary mobile communication network or primary network and a VPLMN may be referred to as a secondary mobile communication network or secondary network.

The CN 110 of radio communication system 100 includes various network functions for implementing functionalities for the core network, e.g. the 5G core network. One of these network functions is the Access and Mobility Management Function (AMF). The AMF handles tasks such as termination of non-access stratum (NAS) signaling, NAS ciphering and integrity protection, registration management, connection management, mobility management, access authentication and authorization, and security context management. In radio communication system 100, NF component 106 may correspond to the AMF of a VPLMN, i.e. V-AMF.

Another of these network functions is the User Data Management (UDM) function, which handles tasks such as generation of authentication and key agreement (AKA) credentials, user identification handling, access authorization, and subscription managements. In radio communication system 100, NF component 108 may correspond to the UDM of the HPLMN, i.e. H-UDM.

Accordingly, NF component 108 may further include access to the mobile terminal's 102 subscription database, which is known as the Unified Data Repository (UDR). The core network may further include components for implementing other functions of the core network, including, but not limited to, an Authentication Server Function (AUSF), a Session Management Function (SMF) component, and a Policy Control Function (PCF) component, etc.

In sum, radio communication system 100 may include functional components for both a primary network (i.e. HPLMN) and one or more secondary networks (i.e. VPLMNs) so that the mobile terminal can operate both on the home network and also when it moves beyond coverage of the home network. The home network may correspond to a Public Land Mobile Network (PLMN) where a subscriber's profile, e.g. corresponding to mobile terminal 102, is maintained. For example, this may correspond to a MNO network in a specific geographic region, e.g. a particular region or country. The secondary network may therefore correspond to a VPLMH which is any other PLMN that is not the HPLMN, e.g. any network in which the mobile terminal has roamed to when leaving the HPLMN.

NF component 106 and NF component 108 may be configured to communicate with one another via a particular interface such as a Nudm interface, which corresponds to a service-based interface for the UDM function.

NF component of the primary network 108 may be able to configure its mobile terminals' subscriptions (e.g. a subscriber identity module (SIM) of a UE) to indicate to the mobile terminal 102 that it can expect to receive SoR information due to initial registration in a secondary network. At the same time, the NF component 108 can note in its database (e.g. a repository database) that the mobile terminal is expected to receive an SoR information upon initial registration with a secondary network. In this case, it is mandatory for the NF component 108 to provide the SoR information to the mobile terminal 102 during initial registration in a secondary network. Otherwise, if such a configuration is not provided in the mobile terminal's subscription, it is optional for NF component 108 to provide the SoR information to the mobile terminal 102 during initial registration based on operator policy.

Additionally, the primary network may, via NF component 108, provide SoR information to the mobile terminal 102 during other registration procedures, e.g. for mobility and/or periodic registration updates, on the secondary network through NF component 106. Accordingly, the primary network may provide the SoR information to the mobile terminal 102 once it registers with the secondary network during any of an "Initial Registration," "Emergency Registration," "Mobility Registration Update," or "Periodic Registration Update" (collectively, forming at least part of "a plurality of registration updates"). Furthermore, the primary network may optionally request the mobile terminal to provide an acknowledgment (ACK) of successful reception of the SoR information.

In some aspects of this disclosure, one or more additional parameters for signaling between the NF components 106 and 108 is provided in order to ensure that the mobile terminal 102 is provided with up-to-date network connection information (e.g. SoR information) for connecting to secondary mobile communication networks and/or to optimize signaling between the network function components of the primary mobile communication network and one or more secondary mobile communication networks.

In order to implement the procedures described herein, NF component 108 may be configured to generate an indication 120 which informs NF component 106 whether it needs to request an updated communication network connection information (e.g. an SoR information) from NF component 108 should there be any subsequent registration requests sent to NF component 106 from a mobile terminal 102. This indication may be dependent on a registration type of a plurality of registration types. For example, for an "Initial Registration", the indication may require the mobile terminal to be directed towards a first VPLMN, and/or for an "Emergency Registration", the indication may require the mobile terminal to be directed towards a second VPLMN. The indication generated in 120 may be defined as a "Registration Update Indicator for [X]," where [X] may be an Initial Registration, an Emergency Registration, a Mobility Registration Update, or a Periodic Registration Update. The indicator may be independently determined for one or more types of the registration types of the plurality of registration types described herein.

Whenever mobile terminal 102 leaves the coverage of the primary mobile communication network (i.e. the HPLMN), it may transmit a registration request 122, via one or more radio access network nodes shown by RAN 104, to one or more secondary mobile communication networks (i.e. one or more VPLMNs). For example, registration request 122 may be transmitted from mobile terminal 102 when roaming so that it may register with a VPLMN in order to conduct mobile communications beyond coverage of the HPLMN. The registration request may include a registration type of the plurality of the registration types.

In response to the registration request 122 from the mobile terminal, which may be an "Initial Registration" request for the first time the mobile terminal 102 attempts to connect with the secondary mobile communication network, NF component 106 transmits a first message 124a to NF component 108. First message 124a may include information based on the registration request 122 received from mobile terminal 102. The first message 124a may be, for example, a Nudm_SDM_Get message as part of the Nudm_SDM_Get service operation procedure. In response to the first message 124a, NF component 108 may transmit a response message 124b to NF component 106. The response message may include a communication network connection information for one or more of a plurality of registration types (e.g. for the registration type indicated in the registration request 122) and the indication to NF component 106 as to whether to request an updated communication network information from NF component 108 for one or more of the plurality of registration types in response to any subsequent registration requests from the mobile terminal 102. The response message 124b may be, for example, a Nudm_SDM_Get response message which introduces the indication into the message field to accompany the SoR information.

Accordingly, in addition to providing the network connection information (e.g. SoR information) in the response 124b to the first message 124a, NF component 108 also provides the new indication it generated in 120 in the response 124b. In this manner, NF component 106 may store the indication as shown by 126 so that it knows whether or not to request updated SoR information for any subsequent registration requests 130 from the mobile terminal 102 depending on the type of registration in the subsequent registration requests 130. For example, this may correspond to a V-AMF (i.e. NF component 106) storing a "Registration Update Indicator for Initial Registration" or "Registration Update Indicator for Emergency Registration" or "Registration Update Indicator for Mobility Registration Update" or "Registration Update Indicator for Periodic Registration Update" (i.e. indicator) as part of a UE context.

Once the mobile terminal 102 transmits one or more subsequent registration requests 130, wherein each of the subsequent registration requests contain a registration type of the plurality of registration types, NF component 106 determines whether it needs to contact NF component 108 for acquiring communication network connection information again or whether it can use the network connection information from before. If NF component 106 determines that, based on the registration type from the subsequent registration request 130 and also based on the indication stored in 126, it needs to contact NF component 108, it may send a subsequent (e.g. second) message 132a to NF component 108. NF component 108 may then send an updated response 132b, wherein the updated response 132b includes updated network connection information (e.g. SoR information). It is appreciated that the updated network connection information may be the same as that transmitted in 124b or it may be different. In addition, response 132b may include an updated indication whether to request further updated network connection information from NF component 108. For example, in 124b, the NF component 108 may transmit an indication to NF component 106, which indicates whether the NF component 108 requires the NF component 106 to provide the NF component 108 with the Registration Type that is sent by the mobile terminal for any subsequent "Initial Registration" or "Emergency Registration" or "Mobile Registration Update" or "Periodic Registration Update" performed by the UE. to get an updated SoR information direction for one of an Initial Registration, Emergency Registration, Mobility Registration Update, or Periodic Registration Update, and in 132b, NF component 108 may update the indication it sent in 124b, for example, by retracting it. NF component 106 then stores this indication again (as it did in 126), and transmits the updated network connection information 134 to the mobile terminal 102.

Tables 1 and 2 show exemplary updates to the Enhancements of a UE's Subscription and Enhancement of UE context stored in NF component 106 (e.g. in V-AMF), respectively. The bold portions of the table show the enhancements provided according to some aspects of this disclosure.

TABLE 1

Enhancements of UE's Subscription

| Subscription Data Type | Field | Description |
|---|---|---|
| Access and Mobility Subscription data (data needed from UE) | Steering of Roaming | List of preferred PLMN/Access technology combinations or HPLMN indication that no change of the "Operator Controlled PLMN Selector with Access Technology" list stored in the UE is needed (see NOTE 3). Optionally includes an indication that the UDM requests an ACK if the reception of the information from the UE |
| | Registration Update Indicator for Initial Registration | An indication whether the UDM requests the UE to get an (updated) Steering of Roaming information whenever the UE sends a Registration request with the Registration Type of "Initial Registration" Or An indication whether the UDM requests the AMF to provide it with the NAS Registration Type for every "Initial Registration" performed by the UE. |
| | Registration Update Indicator for Emergency Registration | An indication whether the UDM requests the UE to get an (updated) Steering of Roaming information whenever the UE sends a Registration request with the Registration Type of "Emergency Registration" Or An indication whether the UDM requests the AMF to provide it with the NAS Registration Type for every "Emergency Registration" performed by the UE. |
| | Registration Update Indicator for Mobility Registration Update | An indication whether the UDM requests the UE to get an (updated) Steering of Roaming information whenever the UE sends a Registration request with the Registration Type of "Mobility Registration Update" or An indication whether the UDM requests the AMF to provide it with the NAS Registration Type for every "Mobility Registration Update" performed by the UE. |

TABLE 1-continued

Enhancements of UE's Subscription

| Subscription Data Type | Field | Description |
|---|---|---|
| | Registration Update Indicator for Periodic Registration Update | An indication whether the UDM requests the UE to get an (updated) Steering of Roaming information whenever the UE sends a Registration request with the Registration Type of "Periodic Registration Update" or An indication whether the UDM requests the AMF to provide it with the NAS Registration Type for every "Periodic Registration Update" performed by the UE. |

TABLE 2

Enhancements of UE context stored in AMF

| Field | Description |
|---|---|
| SUPI | SUPI (Subscription Permanent Identifier) is the subscriber's permanent identity in 5GS. |
| Routing Indicator | UE's Routing Indicator that allows together with SUCI/SUPI Home Network Identifier to route network signalling to AUSF and UDM instances capable to serve the subscriber |
| UDM Group ID | The UDM Group ID for the UE. |
| SUPI-unauthenticated-indicator | This indicates whether the SUPI is unauthenticated. |
| GPSI | The GPSI(s) of the UE. The presence is dictated by its storage in the UDM. |
| 5G-GUTI | 5G Globally Unique Temporary Identifier. |
| For each access type level context within the UE access and mobility context: | |
| Access Type | Indicates the access type for this context. |
| Registration Area | Current Registration Area (a set of tracking areas in TAI List). |
| Registration Update Indicator for Initial Registration | An indication whether the UDM requests a UE to get an (updated) Steering of Roaming information, when the UE sends a Registration request with the Registration Type of "Initial Registration" Or An indication whether the UDM requests the AMF to provide it with the NAS Registration Type for every "Initial Registration" performed by the UE. |
| Registration Update Indicator for Emergency Registration | An indication whether the UDM requests a UE to get an (updated) Steering of Roaming information, when the UE sends a Registration request with the Registration Type of "Emergency Registration" Or An indication whether the UDM requests the AMF to provide it with the NAS Registration Type for every "Emergency Registration" performed by the UE. |
| Registration Update | An indication whether the UDM |

TABLE 2-continued

Enhancements of UE context stored in AMF

| Field | Description |
|---|---|
| Indicator for Mobility Registration Update | requests a UE to get an (updated) Steering of Roaming information, when the UE sends a Registration request with the Registration Type of "Mobility Registration Update" |
| Registration Update Indicator for Periodic Registration Update | An indication whether the UDM requests a UE to get an (updated) Steering of Roaming information, when the UE sends a Registration request with the Registration Type of "Periodic Registration Update" |

Figure 2:
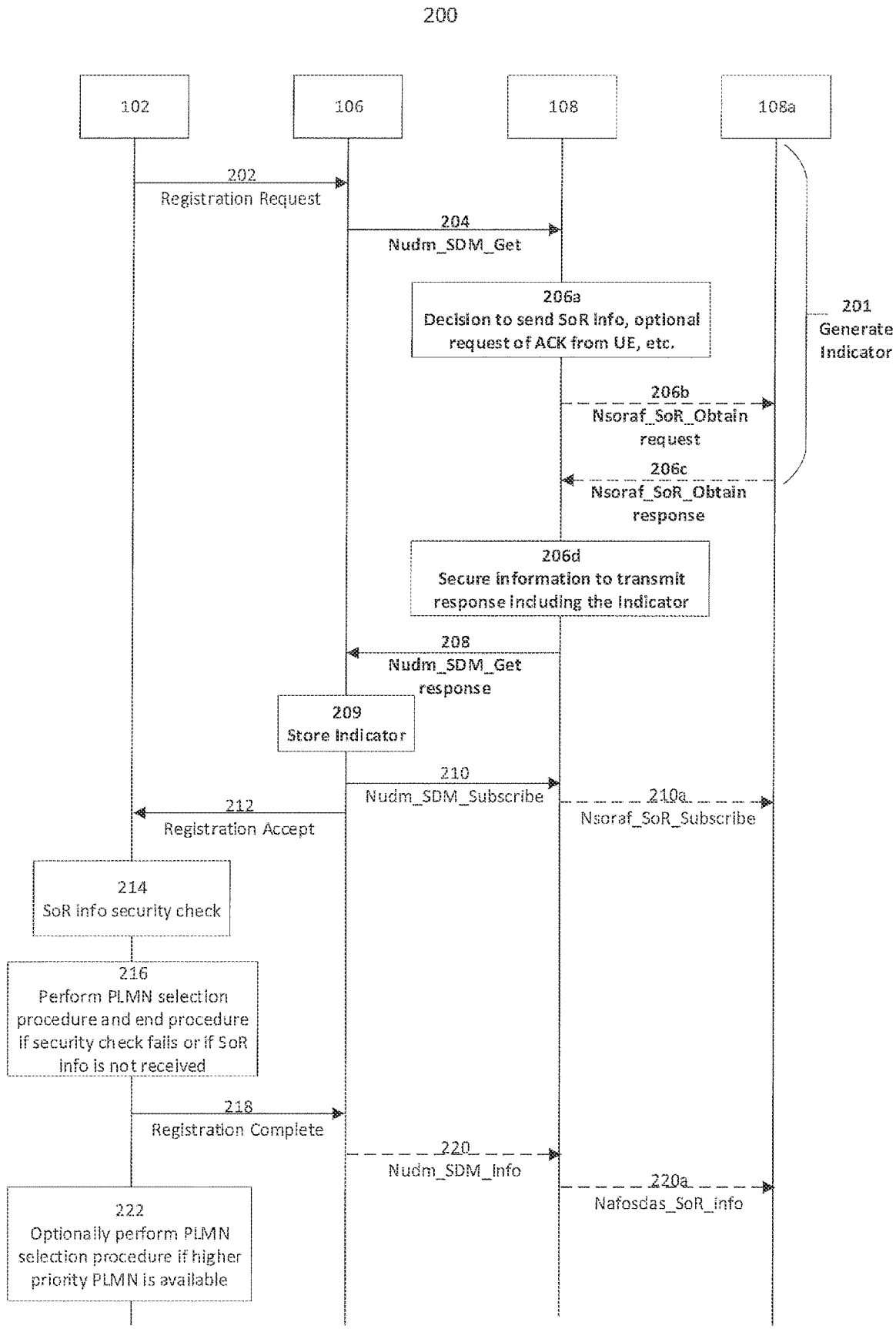
FIG. 2 shows an exemplary Message Sequence Chart (MCS) illustrating signaling between different network components according to some aspects.

FIG. 2 shows an exemplary message sequence chart (MSC) 200 illustrating a message sequence flow according to some aspects. It is appreciated that MSC 200 is exemplary in nature and may thus be simplified for purposes of this explanation.

MSC 200 provides information for the case when a mobile terminal registers with a network function component 106, e.g. AMF, of a secondary mobile communication network, e.g. a VPLMN. As previously indicated, 108 corresponds to the network function component of the primary mobile communication network, e.g. the H-UDM, and 102 corresponds to the mobile terminal. 108a corresponds to the Steering of Roaming (SoR) Application Function (SOR-AF) of NF component 108 of the primary network, i.e. the H-UDM.

Generally speaking, MSC 200 may follow a procedure as described in Annex C.2 of 3GPP TS 23.122. However, certain enhancements are implemented according to some aspects of this disclosure.

According to the conventional SoR procedure implemented by current 3GPP standards, during registration in a roaming scenario, a UE will transmit a registration request to an Access and Mobility Management Function of a VPLMN, i.e. the V-AMF, to register with the network. This registration request includes a registration type. The V-AMF will then communicate with the Unified Data Management (UDM) function of a HPLMN, i.e. the H-UDM, to obtain subscription information for the UE by using a Nudm-SDM_Get service operation. The Subscriber Data Management (SDM) service provides the requested data from a user of the UE's subscription to the VPLMN. Any network functions that consume SDM information can also subscribe to notifications sent by the Nudm producer (in this case, the VPLMN) when that information changes. The subscription information provided by this service includes data needed for network slice selection, UE registration, network access and mobility management, SMF selection, session management, UE SMF context, SMS subscription and management, and PDU session establishment.

The enhancements in accordance with this disclosure are added to MSC 200 and highlighted in the bold messages and tasks, i.e. shown by reference numbers 201 and 204-209 in MSC 200. These enhancements are described in more detail below.

First, as shown by 201, NF component generates an indicator for one or more of the plurality of registration types available for when a mobile terminal registers with a secondary network. It is to note that generating can be done either by the component 108 or the component 108a. Examples of these indicators are shown in Table 1.

The Nudm_SDM_Get 204 request from NF component 106 of the secondary mobile communication network to the NF component 108 of the primary mobile communication network includes the registration type from the registration request 202. Once NF component 108 receives the Nudm_SDM_Get request 204 (i.e. the first message), it performs a series of tasks shown in 206a-206c to obtain the network connection information (i.e. the SoR information) and the indicator generated in 201. After securing the information in 206d and preparing the response, it transmits the Nudm_SDM_Get response 208 which includes the indicator in addition to the SoR information. NF component 106 stores the indicator in 209, and may complete the rest of the registration procedure in 210-222 as described in TS 23.122.

Figure 3:
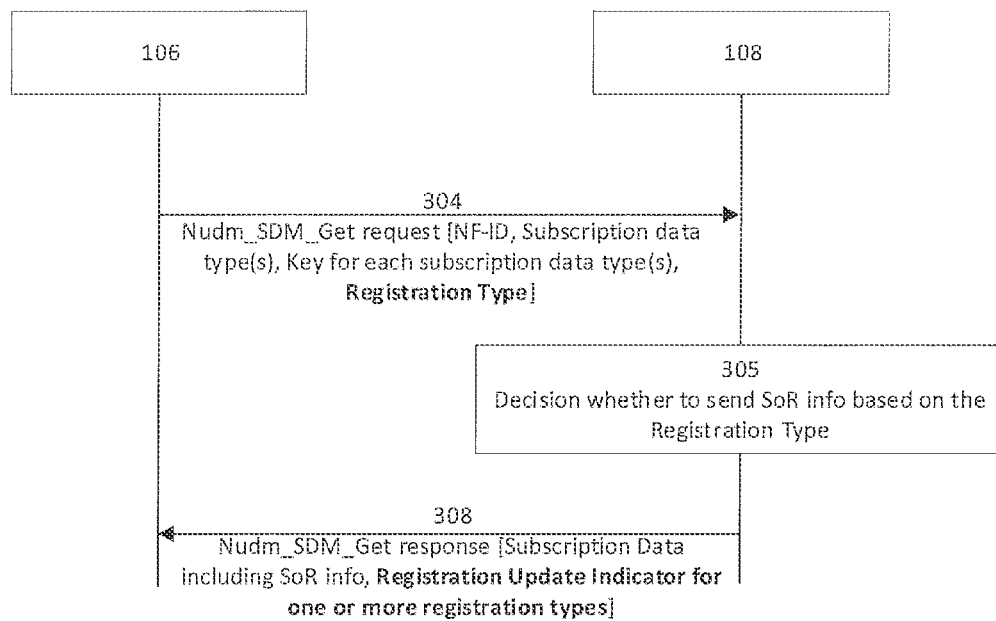
FIG. 3 shows an exemplary MCS illustrating signaling between a network function component of a secondary mobile communication network and a network function component of a primary mobile communication network according to some aspects.

FIG. 3 shows an MSC 300 illustrating enhancements (indicated in bold) of a Nudm_SDM_Get service operation according to some aspects. This operation may correspond to signaling exchanged between the NF component 106 of the secondary mobile communication network and the NF component 108 of the primary mobile communication network, i.e. the V-AMF and the H-UDM, respectively. It is appreciated that MSC 300 is exemplary in nature and may thus be simplified for purposes of this explanation.

As discussed in the description with respect to FIG. 2, the Nudm_Service_Get request (i.e. corresponding to a first message, or any subsequent messages, from NF component 106 to NF component 108) includes the registration type in the message field of message 304. The registration type may be one of an "Initial Registration," an "Emergency Registration," a "Mobility Registration Update," or a "Periodic Registration Update," for example.

In 305, the NF component 108 of the primary network, e.g. the H-UDM, determines whether to send SoR information based on the registration type indicated in 304. And, in 308, the NF component 108 of the primary network transmits the Nudm_SDM_Get response, including the indication, i.e. Registration Update Indicator for one or more of the registration types to the NF component 106 of the secondary network, e.g. V-AMF.

Figure 4:
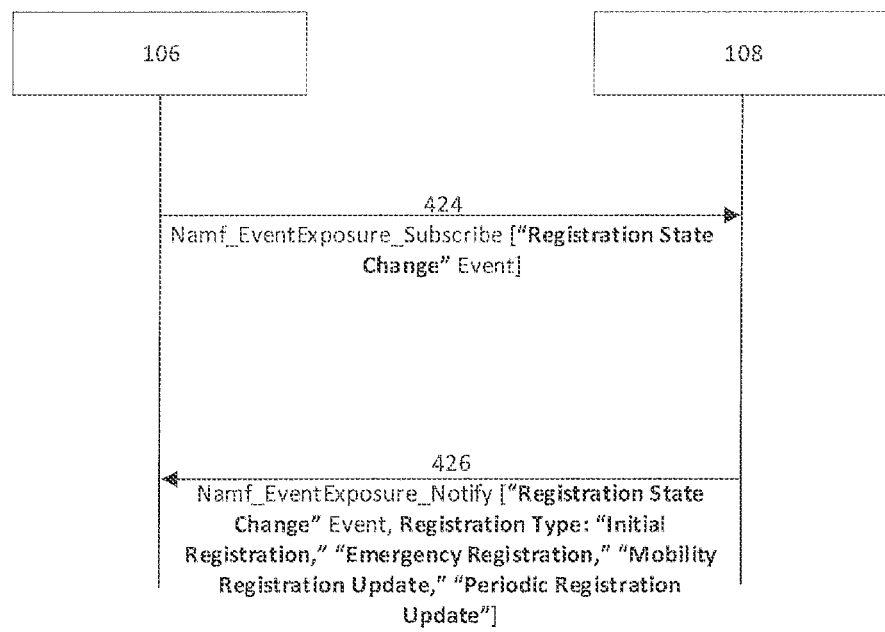
FIG. 4 shows an exemplary MSC illustrating signaling between a network function component of a secondary mobile communication network and a network function component of a primary mobile communication network according to some aspects.

FIG. 4 shows an MSC 400 illustrating enhancements (indicated in bold) of a Namf_EventExposure according to some aspects. This signaling operation may correspond to signaling exchanged between the NF component 106 of the secondary mobile communication network and the NF component 108 of the primary mobile communication network, i.e. the V-AMF and the H-UDM, respectively. It is appreciated that MSC 400 is exemplary in nature and may thus be simplified for purposes of this explanation.

According to some aspects, NF component 108 of the primary network may subscribe for a state change of registration type. For example, two or more PLMNs (a HPLMN and one or more VPLMNs) may have an arranged agreement. The VPLMN of the pair may configure its associated AMF(s) in a manner so that the AMF(s) always has to perform the Nudm_SDM_Get operation for any mobile terminal that is registered with the HPLMN with which the VPLMN has an agreement. To implement this aspect, an additional parameter is added in the registration procedure that the AMF shall invoke a Nudm_SDM_Get service operation for any of the specific registration type (e.g. "Initial Registration" or "Emergency Registration") based on the local configuration available at the AMF, e.g. the agreement with a partner PLMN.

The NF component 108 responsible for a particular subscriber of a mobile terminal provides all the SoR information for the different types of registration request messages in advance of the mobile terminal during the initial registration. In other words, the NF component 108 conveys to the mobile terminal that if the mobile terminal performs an "Initial Registration," for example, then the mobile terminal should also perform a certain task, e.g. "Task A." Similarly, for an "Emergency Registration" type, the mobile terminal is instructed to perform a task, which may be "Task A" or it may be a different task, "Task B." It is appreciated that tasks may be assigned to the other registration types as well. This process may be implemented by the exchange of messages as shown in 424-426.

Figure 5:
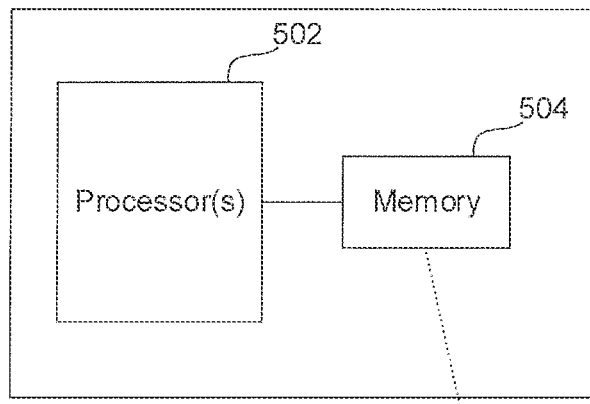
FIGS. 5 and 6 show exemplary configurations for a network function component of a secondary mobile communication network and a network function component of a primary mobile communication network according to some aspects.
Figure 6:
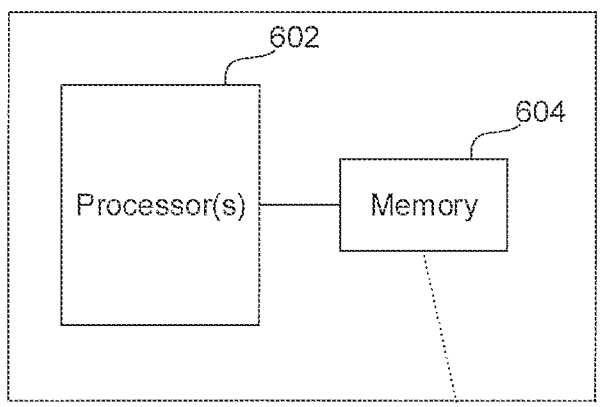

FIGS. 5 and 6 shows exemplary internal configurations of a NF component 106 of a secondary mobile communication network and a NF component 108 of a primary mobile communication network, respectively. It is appreciated that these configurations are exemplary in nature and may thus be simplified for purposes of this explanation.

In FIG. 5, NF component 106 of a secondary mobile communication network may include one or more processors 502 and memory 504. One or more processors 502 may be configured to retrieve and execute program code to perform the methods described herein. Processor 502 may transmit and receive data over a software-level connection that is physically transmitted over the core network. Memory 504 may be a non-transitory computer readable medium storing instructions for one or more of a receive and forward subroutine 504a, a receive and store subroutine 504b, a provision subroutine 504c, and/or a determination subroutine 504d.

Receive and forward subroutine 504a, a receive and store 504b, a provision subroutine 504c, and/or a determination subroutine 504d may each be an instruction set including executable instructions that, when retrieved and executed by one or more processors 502, perform the functionality of NF component 106 as described herein.

Receive and forward subroutine 504a may include instructions for receiving a registration request and any subsequent registration requests from the mobile terminal, wherein the registration request and any subsequent registration requests include a registration type of a plurality of registration types and transmitting, and forwarding to a network function component of a primary mobile communication network, a first message including information based on the registration type indicated in the respective registration request.

Receive and store subroutine 504b may include instructions for receiving a response message from the network function component of the primary mobile communication network, the response message including a communication network connection information for one or more of the plurality of registration types and an indication whether the primary mobile communication network or the network function component of the primary mobile communication network requests the network function component of the secondary mobile communication network to get an updated communication network connection information from the network function component of the primary mobile communication network for one or more of the plurality of registration types in response to a subsequent registration request from the mobile terminal and storing the communication network connection information and the indication.

Provision subroutine 504c may include instructions for providing the communication network connection information to the mobile terminal.

Determination subroutine 504d may include instructions for determining whether to generate a message to transmit to the network function component of the primary mobile communication network based on the stored indication and any subsequent registration requests.

In FIG. 6, NF component 108 of a primary mobile communication network may include one or more processors 602 and memory 604. One or more processors 602 may be configured to retrieve and execute program code to perform the methods described herein. Processor 602 may transmit and receive data over a software-level connection that is physically transmitted over the core network. Memory 604 may be a non-transitory computer readable medium storing instructions for one or more of a generation subroutine 604a and a receive and transmit subroutine 604b.

Generation subroutine 604a and a receive and transmit subroutine 604b may each be an instruction set including executable instructions that, when retrieved and executed by one or more processors 602, perform the functionality of NF component 108 as described herein.

Generation subroutine 604a may include instructions for generating, specific to the mobile terminal, a communication network connection information for connecting to one or more secondary mobile communication networks based on a plurality of registration types and an indication whether the primary mobile communication network or the network function component of the primary mobile communication network requests the network function component of the secondary mobile communication network to get an updated communication network connection information for one or more of the plurality of registration types.

Receive and transmit subroutine 604b may include instructions for receiving a message from a network function component of a secondary mobile communication network, wherein the message is based on a registration request from the mobile terminal, wherein the registration request includes a registration type of the plurality of registration types; and transmitting a response message to the network function component of the secondary mobile communication network, wherein the response message includes communication network connect information based on the registration type from the registration request and the indication generated from generation subroutine 604a.

Figure 7:
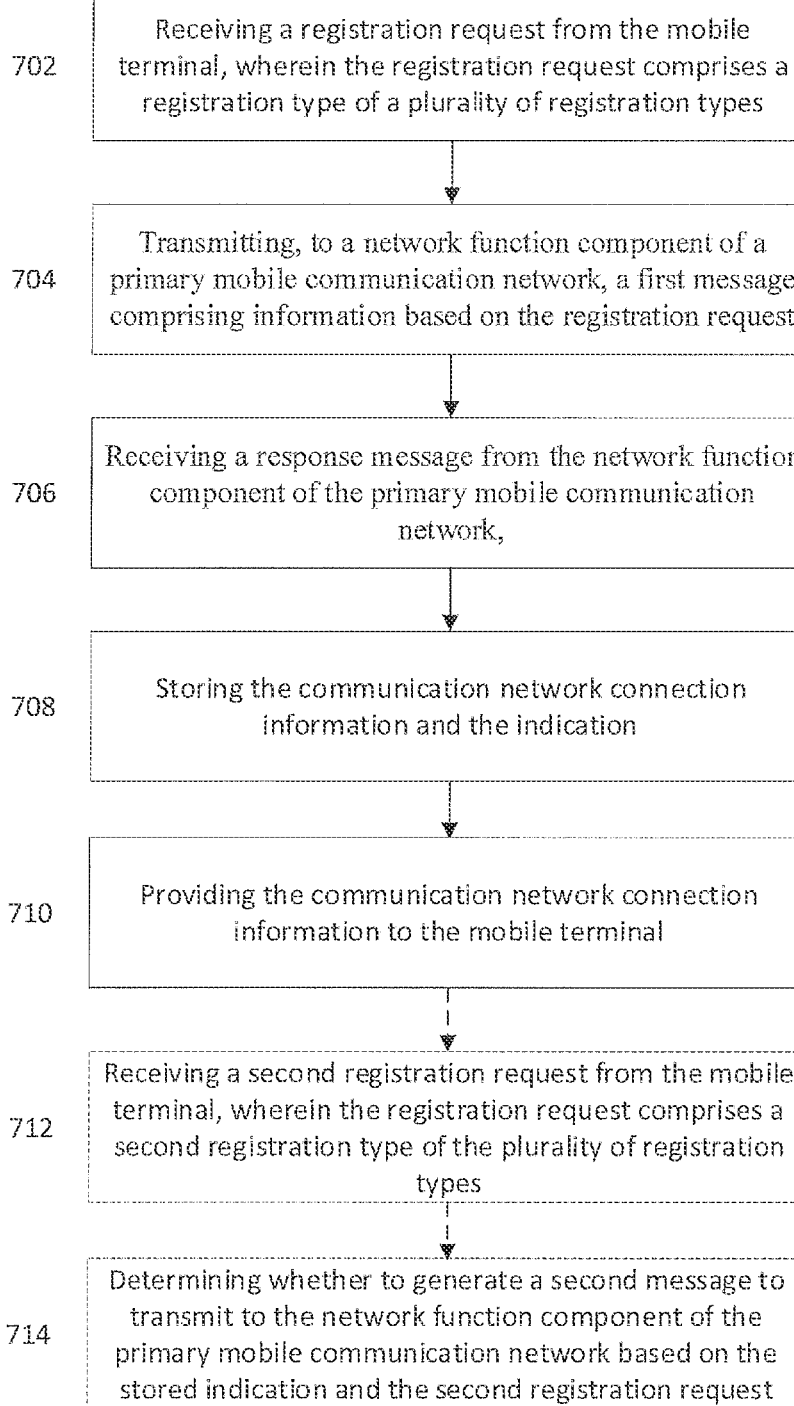
FIG. 7 shows an exemplary flow chart illustrating a method for providing a mobile terminal with network connection information from a viewpoint of network function component of a secondary mobile communication network according to some aspects.

FIG. 7 shows a flowchart 700 showing a method for network function component of a secondary mobile communication network to provide a communication network connection information to a mobile terminal. It is appreciated that flowchart 700 is exemplary in nature and may thus be simplified for purposes of this explanation.

The method shown in flowchart 700 may include receiving a registration request from the mobile terminal, wherein the registration request includes a registration type of a plurality of registration types 702; transmitting, to a network function component of a primary mobile communication network, a first message including information based on the registration request 704; receiving a response message from the network function component of the primary mobile communication network 706, wherein the response message includes a communication network connection information for one or more of the plurality of registration types and an indication whether the primary mobile communication network or the network function component of the primary mobile communication network requests the network function component of the secondary mobile communication network to get an updated communication network connection information from the network function component of the primary mobile communication network for one or more of the plurality of registration types in response to a subsequent registration request from the mobile terminal; storing the communication network connection information and the indication 708; and providing the communication network connection information to the mobile terminal 710.

The method shown in flowchart 700 may further include receiving a second registration request from the mobile terminal, wherein the registration request includes a second registration type of the plurality of registration types 712; and determining whether to generate a second message to transmit to the network function component of the primary mobile communication network based on the stored indication and the second registration request 714.

Figure 8:
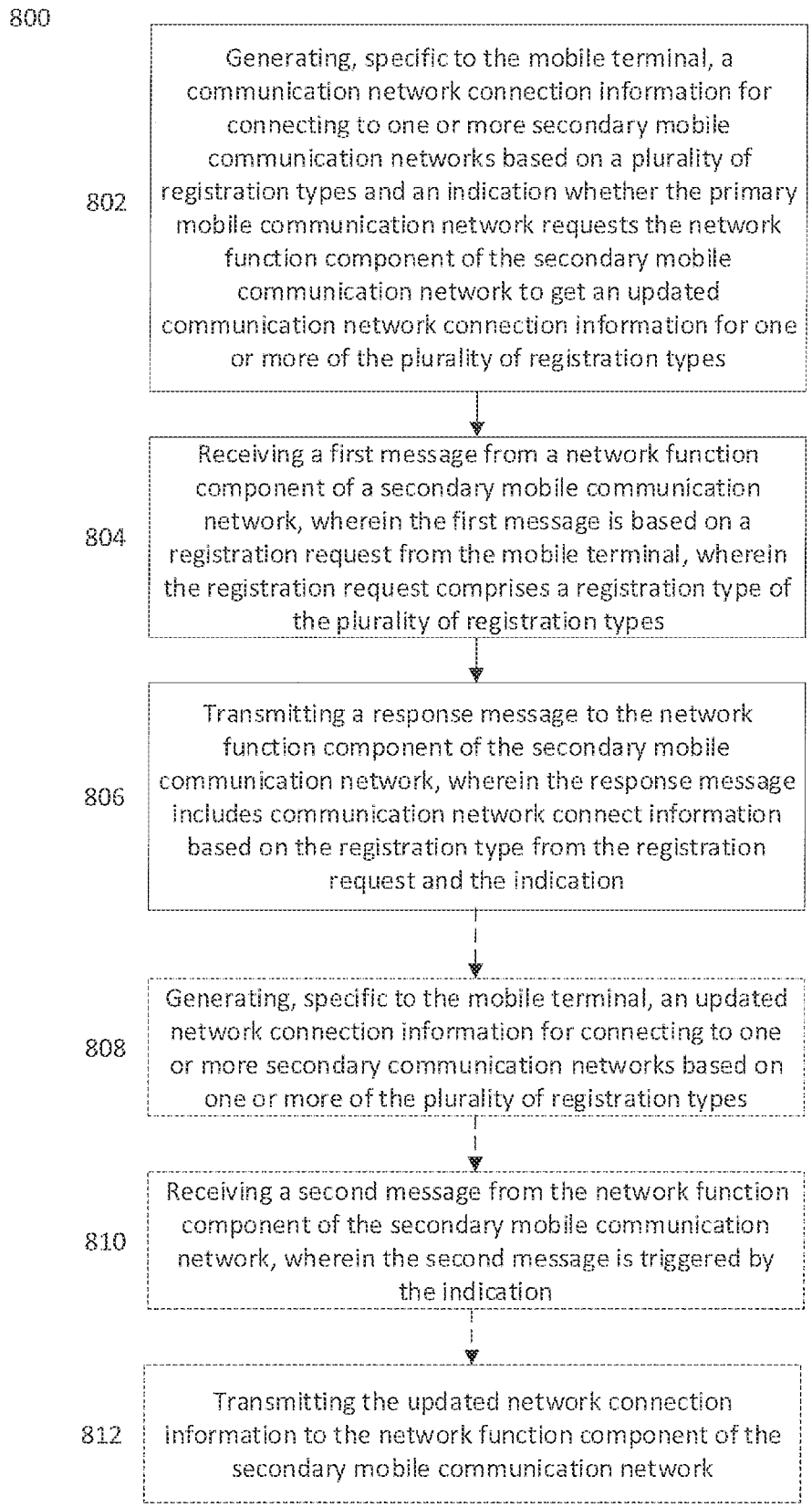
FIG. 8 shows an exemplary flow chart illustrating a method for providing a mobile terminal with network connection information from a viewpoint of network function component of a primary mobile communication network according to some aspects.

FIG. 8 shows a flowchart 800 showing a method for a network function component of a primary mobile communication network to provide a communication network connection information specific to a mobile terminal. It is appreciated that flowchart 800 is exemplary in nature and may thus be simplified for purposes of this explanation.

The method shown in flowchart 800 may include generating, specific to the mobile terminal, a communication network connection information for connecting to one or more secondary mobile communication networks based on a plurality of registration types and an indication whether the primary mobile communication network or the network function component of the primary mobile communication network requests the network function component of the secondary mobile communication network to get an updated communication network connection information for one or more of the plurality of registration types 802; receiving a first message from a network function component of a secondary mobile communication network, wherein the first message is based on a registration request from the mobile terminal, wherein the registration request includes a registration type of the plurality of registration types 804; and transmitting a response message to the network function component of the secondary mobile communication network, wherein the response message includes communication network connect information based on the registration type from the registration request and the indication 806.

The method shown in flowchart 800 may further include generating, specific to the mobile terminal, an updated network connection information for connecting to one or more secondary communication networks based on one or more of the plurality of registration types 808; receiving a second message from the network function component of the secondary mobile communication network, wherein the second message is triggered by the indication 810; and transmitting the updated network connection information to the network function component of the secondary mobile communication network 812.

The components of the communication system (e.g. the data rate storage component, the notification component and the data rate management component) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions described above may also be understood as a "circuit".

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A network function component of a secondary mobile communication network comprising one or more processors, the one or more processors configured to:
    receive a registration request from a mobile terminal, wherein the registration request comprises a registration type of a plurality of registration types;
    forward, to a network function component of a primary mobile communication network, a first message comprising information based on the registration request;
    receive a response message from the network function component of the primary mobile communication network, the response message comprising a communication network connection information for one or more of the plurality of registration types and an indication whether the primary mobile communication network or the network function component of the primary mobile communication network requests the network function component of the secondary mobile communication network to get an updated communication network connection information from the network function component of the primary mobile communication network for one or more of the plurality of registration types in response to a subsequent registration request from the mobile terminal;
    store the communication network connection information and the indication;
    provide the communication network connection information to the mobile terminal;
    receive the subsequent registration request from the mobile terminal, wherein the subsequent registration request comprises a second registration type of the plurality of registration types; and determine whether to generate a second message to transmit to the network function component of the primary network based on the stored indication and the second registration request.

2. The network function component of the secondary mobile communication network of claim 1, wherein the second registration type is the same as the registration type.

3. The network function component of the secondary mobile communication network of claim 2, the one or more processors further configured to:
generate and transmit, to the network function component of the primary mobile communication network, the second message comprising information based on the second registration request; and
receive an updated response from the network function component of the primary mobile communication network, the updated response comprising an updated communication network connection information for one or more registration types of the plurality of registration types.

4. The network function component of the secondary mobile communication network of claim 1, wherein the second registration type is different from the registration type.

5. The network function component of the secondary mobile communication network of claim 1, the one or more processors further configured to:
generate and transmit, to the network function component of the primary mobile communication network, the second message comprising information based on the second registration request; and
receive an updated response from the network function component of the primary mobile communication network, the updated response comprising an updated communication network connection information for one or more registration types of the plurality of registration types.

6. The network function component of the secondary mobile communication network of claim 5, the one or more processors further configured to:
store the updated communication network connection information; and
provide the updated communication network connection information to the mobile terminal.

7. The network function component of the secondary mobile communication network of claim 5, the updated response further comprising an updated indication whether to request further updated network connection information from the network function component of the primary mobile communication network for one or more of the plurality of registration types in response to one or more further subsequent registration requests from the mobile terminal.

8. A network function component of a primary mobile communication network comprising one or more processors, the one or more processors configured to:
generate, specific to a mobile terminal, a communication network connection information for connecting to one or more secondary communication networks based on one or more of a plurality of registration types and an indication whether the primary mobile communication network or the network function component of the primary mobile communication network requests the network function component of the secondary mobile communication network to get an updated communication network connection information for one or more of the plurality of registration types;
receive a message from a network function component of a secondary mobile communication network, wherein the message is based on a registration request from the mobile terminal, wherein the registration request comprises a registration type of the plurality of registration types; and
transmit a response message to the network management function component of the secondary mobile communication network, wherein the response message comprises communication network connection information based on the registration type from the registration request and the indication;
generate, specific to the mobile terminal, an updated communication network connection information for connecting to one or more secondary networks based on one or more of the plurality of registration types;
receive a second message from the network function component of the secondary mobile communication network, wherein the second message is triggered by the indication; and
transmit the updated network connection information to the network function component of the secondary mobile communication network.

9. The network function component of the primary mobile communication network of claim 8, the one or more processors further configured to:
generate an updated indication whether the primary mobile communication network or the network function component of the primary mobile communication network requests the network function component of the secondary mobile communication network to get further updated communication network connection information for one or more of the plurality of registration types and transmit the updated indication to the network function component of the secondary mobile communication network.

10. A method for a network function component of a secondary mobile communication network to provide a communication network connection information to a mobile terminal, the method comprising:
receiving a registration request from the mobile terminal, wherein the registration request comprises a registration type of a plurality of registration types;
transmitting, to a network function component of a primary mobile communication network, a first message comprising information based on the registration request;
receiving a response message from the network function component of the primary mobile communication network, the response message comprising a communication network connection information for one or more of the plurality of registration types and an indication whether the primary mobile communication network or the network function component of the primary mobile communication network requests the network function component of the secondary mobile communication network to get an updated communication network connection information from the network function component of the primary mobile communication network for one or more of the plurality of registration types in response to a subsequent registration request from the mobile terminal;
storing the communication network connection information and the indication;
providing the communication network connection information to the mobile terminal;

receiving a second registration request from the mobile terminal, wherein the registration request comprises a second registration type of the plurality of registration types; and determining whether to generate a second message to transmit to the network function component of the primary mobile communication network based on the stored indication and the second registration request.

11. The method of claim 10, further comprising:

generating and transmitting, to the network function component of the primary mobile communication network, the second message comprising information based on the second registration request; and receiving an updated response from the network function component of the primary mobile communication network, the updated response comprising an updated communication network connection information for one or more registration types of the plurality of registration types.

12. A method for a network function component of a primary mobile communication network to provide a communication network connection information specific to a mobile terminal, the method comprising:

generating, specific to the mobile terminal, a communication network connection information for connecting to one or more secondary mobile communication networks based on a plurality of registration types and an indication whether the primary mobile communication network or the network function component of the primary mobile communication network requests the network function component of the secondary mobile communication network to get an updated communication network connection information for one or more of the plurality of registration types;

receiving a first message from a network function component of a secondary mobile communication network, wherein the first message is based on a registration request from the mobile terminal, wherein the registration request comprises a registration type of the plurality of registration types; and transmitting a response message to the network function component of the secondary mobile communication network, wherein the response message comprises communication network connect information based on the registration type from the registration request and the indication;

generating, specific to the mobile terminal, an updated network connection information for connecting to one or more secondary communication networks based on one or more of the plurality of registration types;

receiving a second message from the network function component of the secondary mobile communication network, wherein the second message is triggered by the indication; and transmitting the updated network connection information to the network function component of the secondary mobile communication network.

* * * * *